US008395627B2

(12) United States Patent
Friesen

(10) Patent No.: US 8,395,627 B2
(45) Date of Patent: Mar. 12, 2013

(54) SPLINE TECHNIQUE FOR 2D ELECTRONIC GAME

(75) Inventor: Jeremy D. Friesen, Seattle, WA (US)

(73) Assignee: Big Fish Games, Inc., Seattle, WA (US)

( * ) Notice: Subject to any disclaimer, the term of this patent is extended or adjusted under 35 U.S.C. 154(b) by 1012 days.

(21) Appl. No.: 12/110,258

(22) Filed: Apr. 25, 2008

(65) Prior Publication Data

US 2009/0267949 A1    Oct. 29, 2009

(51) Int. Cl.
*G06T 13/00*    (2011.01)
(52) U.S. Cl. .................................................. 345/473
(58) Field of Classification Search ........... 345/473–475
See application file for complete search history.

(56) References Cited

U.S. PATENT DOCUMENTS

| | | | |
|---|---|---|---|
| 5,233,671 A * | 8/1993 | Murayama ................. | 382/242 |
| 5,767,861 A * | 6/1998 | Kimura ...................... | 345/473 |
| 7,098,908 B2 | 8/2006 | Acosta et al. | |
| 7,131,907 B2 | 11/2006 | Miida et al. | |
| 7,254,265 B2 | 8/2007 | Naske et al. | |
| 7,420,564 B2 * | 9/2008 | Cohen et al. ............... | 345/473 |
| 7,782,324 B2 * | 8/2010 | Goldfarb .................... | 345/473 |
| 2003/0063084 A1 | 4/2003 | Burke | |
| 2005/0190204 A1 | 9/2005 | Cohen et al. | |
| 2005/0270295 A1 * | 12/2005 | Cohen et al. ............... | 345/474 |
| 2007/0268293 A1 | 11/2007 | Miller et al. | |

OTHER PUBLICATIONS

Forstmann et al., Deformation Styles for Spline-based Skeletal Animation, Eurographics/ACM Symposium on Computer Animation, Aug. 2007, pp. 141-150.*
Bloomenthal, "Medial Based Vertex Deformation", ACM Siggraph Symposium on Computer Animation, San Antonio, TX, USA, Jul. 21, 2002, pp. 147-151.
Eberly, "3D Game Engine Design", Morgan Kaufmann Publishers, Dec. 31, 2007, pp. 347-349.
"Tutorial 1.4 Bone Setup", retrieved on Jul. 20, 2009 at <<http://www.lostmarble.com/moho/manual/>> MOHO 5 User's Manual (online), Dec. 31, 2004, 9 pgs.
Owen, et al., "Modelling and Interpolating Cartoon Characters", Computer Animation, Proceedings of Geneva, Switzerland, Los Alamitos, CA, USA, IEEE Computer Soc., May 25, 1994, pp. 148-155, and 203 (color plates).
Wikipedia, "Bezier Curve", retrieved on Jul. 20, 2009 at <<http://web.archive.org/web/20071221102710/http://en.wikipedia.org/wiki/B%C3%A9zier_curve>>, Dec. 21, 2007, 5 pgs.
European Search Report for European Patent Application No. EP09158602, mailed on Aug. 5, 2009, 13 pgs.

* cited by examiner

*Primary Examiner* — Xiao M. Wu
*Assistant Examiner* — Charles Tseng
(74) *Attorney, Agent, or Firm* — Lee & Hayes, PLLC

(57) ABSTRACT

A technique for generating splines in two dimensions for use in electronic game play is disclosed. The technique includes generating a computer graphic of a shape to be animated that is formed by one or more splines. The shape also includes at least one joint. When the position or orientation of the joint is changed, the orientation and/or position of the splines corresponding to the joint are changed resulting in changes to the shape.

18 Claims, 6 Drawing Sheets

SPLINE TECHNIQUE FOR 2D ELECTRONIC GAME

BACKGROUND

This application relates to systems and methods for animating shapes in 2-dimensions with splines for use in electronic games.

Animation and modeling systems are available that enable artists to create high-quality content for use in electronic games. A variety of 3D scanning methodologies are used that capture real world shapes. These scanning methods are used with motion capture technologies to record complex performances.

Since the 1980s, 3D graphics hardware accelerators have been used to perform computer aided designs. As computers became more powerful, computers began to mimic moving characters such as lifelike characters in animation stories used in computer games. Most graphic accelerators used in video games employ hardware that quickly draws polygons to create 3-D animation.

Computer animation involves building an animated 3-D figure on a computer monitor that is rigged with a virtual skeleton. A full wire frame model is built on polygons that are formed using joints (also generally referred to as "bones") that allow the model to deform into different position or poses. Surfaces such as skin, nose, ears, etc. are typically added during the rendering process using skinning systems.

A drawback to 3-D animation is that many games operate on a web browser or in a 2-D environment. Such environments do not have links into hardware to use polygon accelerators. In a mobile environment, hardware accelerators may be costly or drain power. Consequently, current 3-D skin drawing techniques are not applicable to the mobile platform or the web based platform.

SUMMARY

A computer-implemented technique is disclosed for generating a computer graphic of a shape to be animated. The shape is constructed using splines. The shape has at least one joint and changes its orientation about the joint using splines. Each of the splines includes at least two points that are defined in two-dimensional space. The splines combine to indicate of an outline of the shape in a base position. Coordinate information is provided indicating the position of the points on each spline corresponding to the outline of the shape at positions in the base position.

The coordinate information is generated for a new position of the spline by blending (a) a relative position of each of the splines with respect to positions of a first joint with (b) relative positions of each of the splines with respect to a second joint. The new position of the spline is generated in response to the coordinate information indicative of the positions of the points on the spline corresponding to the shape at the new position. The spline is rendered at the new position to form the outline of the shape associated with the new position.

In another implementation, a spline is provided with at least two points, each point being defined in two-dimensional space. The spline indicates an outline of the shape in a base position. Coordinate information is provided that indicates the positions of the points on the spline and that indicates the outline to the shape at predefined positions when the shape is to be changed about the joint with respect to the base position. A new position of the spline is generated in response to the provided coordinate information to change the shape.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The following document describes method(s) or software capable of permitting simultaneous purchase, downloading and installation of software applications, such as an electronic game. The method may be provided by any content server, and may be purchased and received by, installed, and activated on any networked electronic device such as a computer, PDA, computer laptop or gaming device. Various examples of the method and software for generating splines for use in an electronic game are described below with reference to FIGS. 1-6.

In one implementation, an animation and modeling system is described which enables artists to create high-quality content in interactive applications. The shape of the objects used in the content are generated using interpolation or blending of the movement of the shape in response to proposed changes in the position or orientation of the joints. Shape interpolation methodology is applied to the articulated figures to create smoothly skinned figures that are depicted in a natural way. The runtime generation of the shape forms runs fast enough in 2-dimensions to be used in interactive applications such as electronic games.

Example System Architecture

Figure 1:
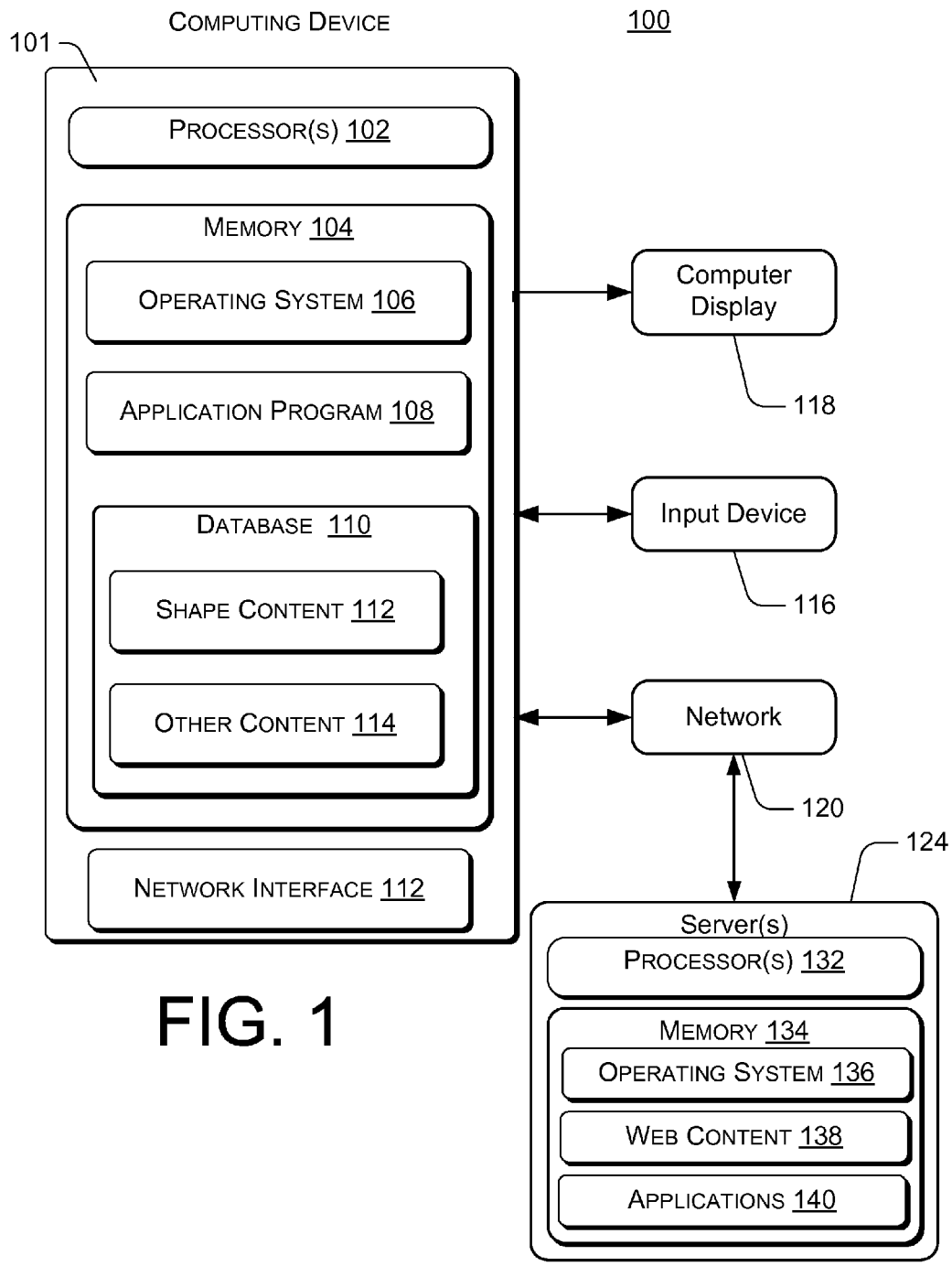
FIG. 1 depicts an exemplary system in which the technique for generating splines is implemented.

The computer environment 100 illustrated in FIG. 1 is a general computer environment that includes a user interface which can generate splines for use in an electronic game environment, such as a video game. Similar resources may use the computer environment and the processes as described herein. The computer environment 100 is only one example of a computer environment and is not intended to suggest any limitation as to the scope of use or functionality of the computer and network architectures. Neither should the computer environment 100 be interpreted as having any dependency or requirement relating to any one or combination of components illustrated in the exemplary computer environment 100.

The computer environment 100 includes a general-purpose computing device in the form of a client device (also referred to as a networked device) 101. The client device 101 can be, for example, one or more of a stand alone computer, laptop computer, a networked computer, a mainframe computer, a PDA, a telephone, a microcomputer or microprocessor, or any other computer device that uses a processor in combination with a memory. The components of the client device 101 can include, but are not limited to, one or more processors or processing units 102 (also herein referred to as processor 102), a system memory 104, network interface 112 and a system bus (not shown) that couples various system components including the processor 102, network interface 112 and the system memory 104.

The memory 104 can comprise a variety of computer readable media. Such media may be any available media that is accessible by the computing device 101 and includes both volatile and non-volatile media, and removable and non-removable media. The process for activating instructions can be stored as instructions sets on the computer readable media.

The system memory 104 may include the computer readable media in the form of non-volatile memory such as read only memory (ROM) and/or volatile memory such as random access memory (RAM).

The client device 101 may also include other removable/non-removable, volatile/non-volatile computer storage media. By way of example, memory 104 may include a hard disk drive (not shown) for reading from and writing to a non-removable, non-volatile magnetic media (not shown), and an optical disk drive, for reading from and/or writing to a removable, non-volatile optical disk such as a CD-ROM, DVD-ROM, or other optical media. The hard disk drive and optical disk drive may each be directly or indirectly connected to the system bus.

The disk drives and their associated computer-readable media provide non-volatile storage of computer readable instructions, program modules, and other data for the client device 101. Although the example depicts a hard disk within the hard disk drive, it is to be appreciated that other types of the computer readable media which can maintain for accessing data that is accessible by a computer, such as non-volatile optical disk drives, floppy drives, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computer environment 100.

Stored in memory 104, including by way of example, may be an operating system (OS) 106, a browser 108 (including other applications or plug-ins for the browser), database 110 and network interface 112.

A user can enter commands and information into the client device 101 via input devices 116 such as a microphone, cursor controller keyboard and/or a pointing device (e.g., a "mouse") which send a signal to the processing unit 102 in response to commands from the user. Other input devices (not shown specifically) may include a joystick, game pad, satellite dish, serial port, scanner, and/or the like. These and other input devices are connected to the processing unit 102 via input/output interfaces (not shown) that are coupled to the system bus of client device 101, but may be connected by other interface and bus structures, such as a parallel port, game port, or a universal serial bus (USB).

An LCD monitor, flat panel displays, touch screen displays, or other type of computer display 118 can also be connected to the system bus via a video interface (not shown), such as a video adapter. In addition to the computer displays 118, other output peripheral devices can include components such as speakers (not shown) which can be connected to the client device 101.

The client device 101 can operate in a networked environment using logical connections to one or more remote computers, such as a remote computer 124 through network 120. By way of example, the remote computer 124 can be a personal computer, portable computer, one or more servers, a router, a network computer, a peer device or other common network node, game console, and the like. The remote computer 124 can be a server that can include many or all of the elements and features described herein relative to the client device 101.

For example, the components of the server 124 can include, but are not limited to, one or more processors or processing units 132 (also herein referred to as server processor 132), a system memory 134, network interface (not shown) and a system bus (not shown) that couples various system components including the processor 132, network interface and the system memory 134. Stored in system memory 134, including by way of example, may be an operating system (OS) 136, web content 138 (including applications to deliver the web content) to be provided to application program 108 and applications 140 (e.g. game content).

Logical connections between the client device 101 and the remote computer 124 (e.g. a service provider) are depicted as a network 120 an Internet (or Intranet) which may include a local area network (LAN) and/or a general wide area network (WAN). Client device 101 may communicate to the remote computer 124 using any communications media via network 120 using network interface 112.

Operating system 106 manages the interaction between the various applications, modules and tools in memory 104 and devices 116-120. Operating system 106 may a Windows® operating system built into the device 102 and available from Microsoft, Inc. of Redmond, Wash. and may include additional middleware interfaces. Application program 108 may include one or more applications including content creation tools. Application program 108 may communicate with the operating system directly to create the objects used in an electronic game or access shape content 112 or other content 114 for use in running the electronic game. Shape content 112 and other content 114 may be uploaded from computing device 101 to server 124 via network 120 for distribution to other computing devices.

Operating system 136 manages the interaction between the various applications, modules and tools in memory 134. Operating system 106 may a server based operating system built into the device 124 and available from various manufacturers, such as Microsoft, Inc. of Redmond, Wash. and may include an additional middleware interfaces.

An implementation of the aforementioned computer video game may be stored on some form of the computer readable media (such as optical disk) or transmitted from the computer media via a communications media to a game player computer. Computer readable media may be any available media that can be accessed by a computer. By way of example, and not limitation, computer readable media may comprise "computer storage media" and "communications media."

"Computer storage media" includes volatile and non-volatile, removable and non-removable media implemented in any process or technology for storage of information such as computer readable instructions, control node data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer playing device.

Various modules and techniques may be described herein in the general context of the computer-executable instructions, such as program modules, executed by one or more computers or other devices. Generally, program modules include routines, programs, control objects, components, control node data structures, etc. that perform particular tasks or implement particular abstract data types. Often, the functionality of the program modules may be combined or distributed as desired in various embodiments.

Figure 2:
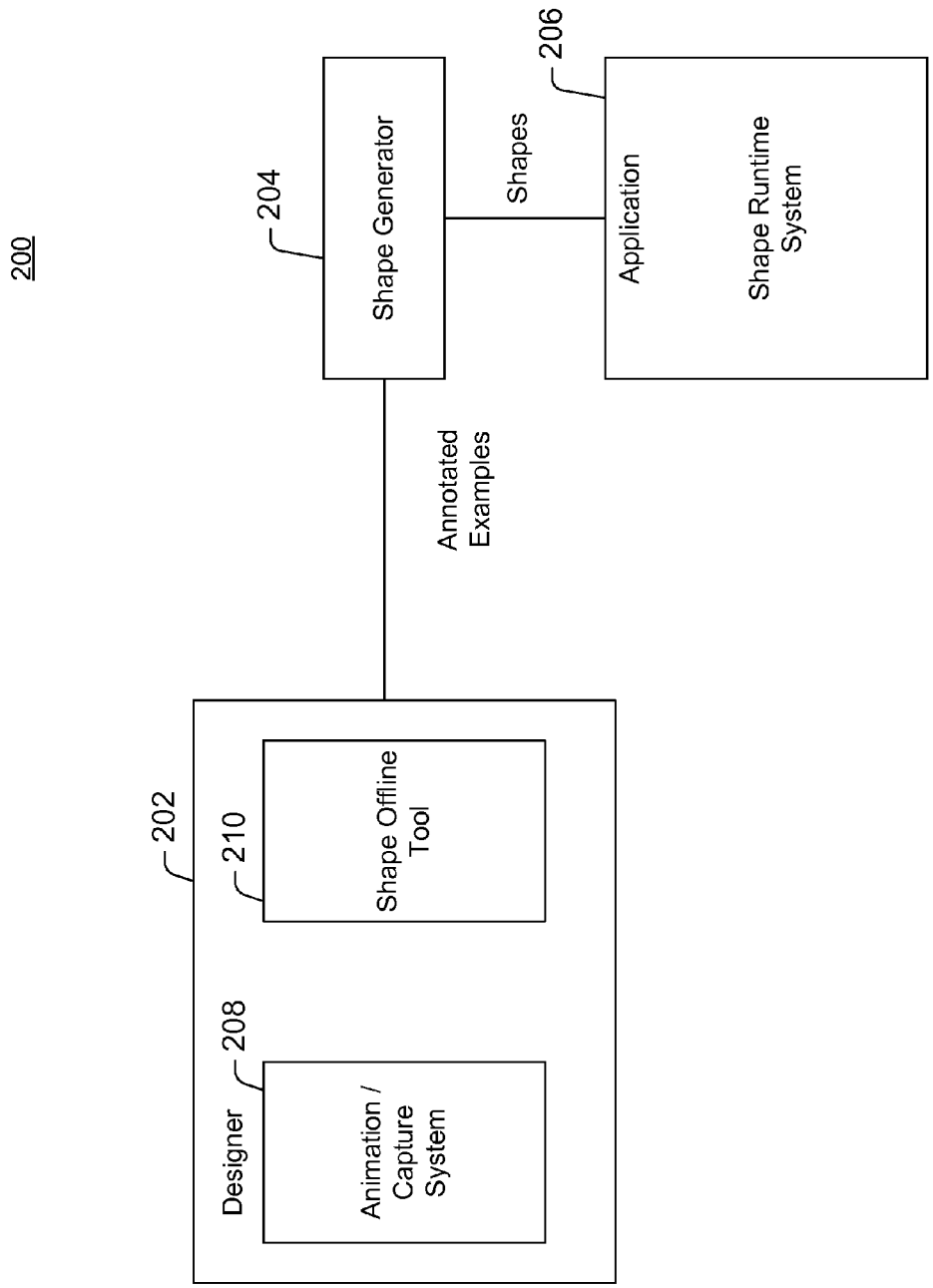
FIG. 2 is a block diagram of an exemplary system in which the spline generating methodology can be employed.

FIG. 2 shows an exemplary system 200 in which the methodologies discussed below can be employed. In the discussion immediately below, the system's components are first identified followed by a discussion of their functionality.

System Components

In the illustrated example, system 200 comprises a designer component 202, a shape generator 204, and an exemplary application 206. One primary focus of system 200 is to provide a way, in an application, to have a very lightweight, fast runtime system that allows for modification of a shape or animation on the fly in the context of the application (which can typically comprise a game).

Designer component 202 comprises a tools module that can include, among other components, animation/capture systems 208. The designer component also comprises various shape offline tools 210 that positions examples in abstract space.

Application 206 comprises a shape runtime system that is embedded in an application, such as a game, that uses the system described below to drive the animation of a character.

System Component Functionality

Typically, a designer relies on external modeling and animation systems and/or geometry and motion capture technology (external tools 208) to create initial or base forms and motions. Additionally, from the base form, other positions of the shape can be modeled that represent movement from the base shape. As an illustration, consider an object that has a shape. One way of capturing the object's shape might be to project structured light onto the object so that a camera and computer can record the object's shape. This shape is digitized and can then be used in graphics applications. For a situation that involves motion, a person might be outfitted with a number of reflectors and then filmed so that a computer can capture their motion. In each of these systems, once the images are captured they are very difficult to modify. In a traditional system, these captured images from externals tools 208 would flow directly to an application that would simply pull out the captured images and run them as appropriate in known ways.

In the illustrated and described embodiment, offline tools 210 enable the designer to organize these example forms or motions that serve as input into shape generator 204. To do so, the designer can choose a set of adjectives that characterize the forms or a set of adverbs that characterize the motions. The adjectives or adverbs define an abstract space and each adjective or adverb represents a separate axis in this abstract space. For instance, adjectives that describe the form of a human arm may include gender, age, and elbow bend. These adjectives are used to define the axes in an abstract space.

In accordance with the present embodiment, an example authoring process may typically follow steps such as (This order of operations is just an example and is not required but each desired key pose should be saved.):

1. Create character using boned skinning method. Typically the author creates the skeletal structure by arranging bones into the correct positions and proportions.

2. For each joint and for each desired pose adjust shape using any technique. In one implementation, after the authoring process is complete, then for each joint of each pose the author uses this skeletal structure as a template to draw a piece of 2d spline art that matches the pose of the skeleton.

3. The software then loads the skeleton, loads the 2d splines and attaches the splines to the bones based on an inverse distance squared formula. In other words, a bone's influence on a spline point is based on the formula: 1/(distance*distance). In one implementation, three bones with the most influence on a point are given ownership of that point. The influence is split proportionally to the inverse distance squared formula.

Once the designer has defined various poses, e.g., using offline tools 210, each joint's motion is annotated with its location in parameter space that defines its location relative to degrees of freedom for that joint. The software then loads animation files and uses those to move the bones. The bones then move the attached spline points based on their proportional ownership of the points.

Based on the annotated examples and the abstract space, shape generator 204 solves for the coefficients corresponding to the plurality of splines that combine together to form a shape around the joint. The output produced by the shape generator 204 is referred to as a "shape". The spline contains information about a line connecting the two points. The spline also includes a third point that in combination with the two points defines a curvature of the line as a function of the distance between the third point and a straight line connecting the two points. Details of the formula employed by the shape generator 204 are described below in connection with FIGS. 4a and 4b.

At runtime, application 206 chooses, at each moment in time, desired values for the adjectives or adverbs, thus defining a specific location in the abstract space. For instance, a character can be set to be happy or sad or anywhere in between; an arm can be specified to be more male or female, or to respond to the bending of the elbow. The shape and verb runtime system 206 then responds to the selected location in the abstract space by efficiently blending the annotated examples to produce a motion of the shape.

Exemplary Process

Figure 3:
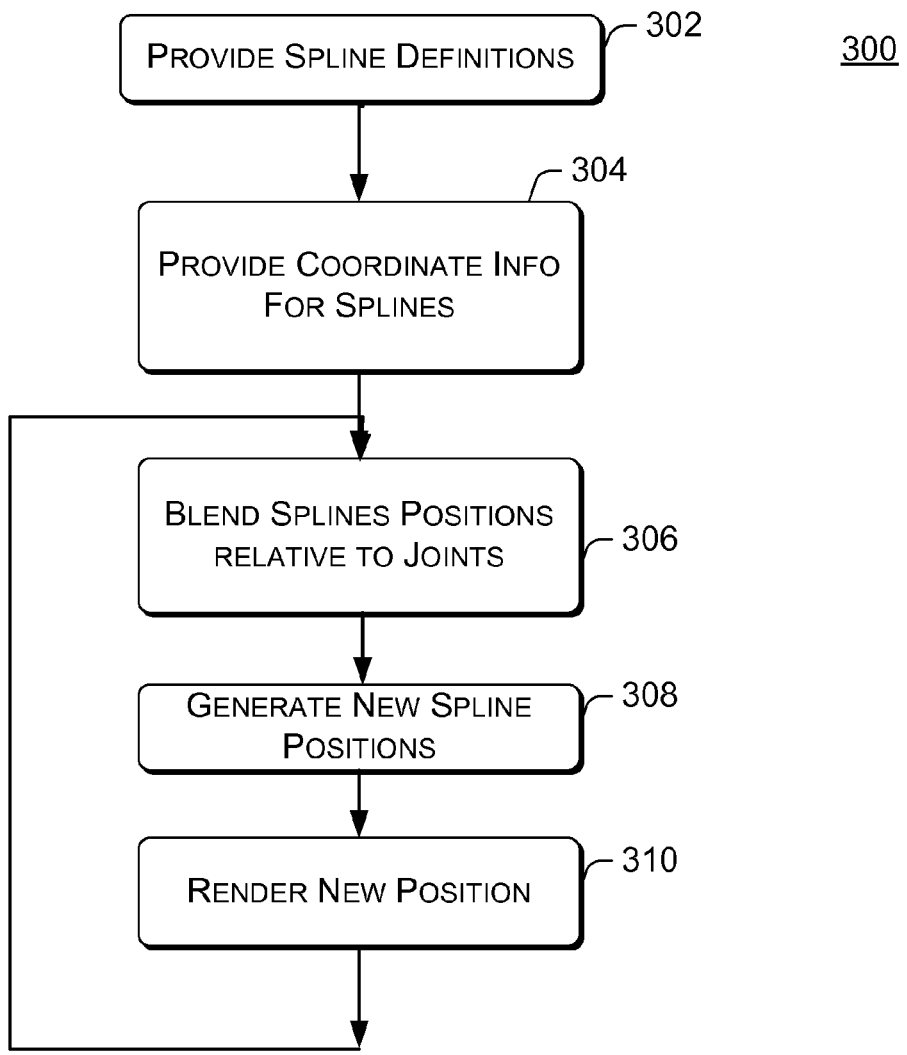
FIG. 3 depicts an illustrative process for generating computer graphic of a shape to be animated using splines using the system described in FIG. 1.

Exemplary process 300, shown in FIG. 3, is illustrated as a collection of blocks in a logical flow diagram. The flow diagram depicts exemplary blocks 302-310 used by processor 102 in system 100 (see FIG. 1), to form the shape around the joints using the spline generating technique. Blocks 302-310 represent a sequence of operations that can be implemented in hardware, software, and a combination thereof. Implementing these blocks results in the displays, illustrated in FIGS. 4-6, to be shown on client device 101. These displays will be created with the description of blocks 302-310 herein.

In the context of software, the blocks 302-310 represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to system 100 of FIG. 1, although it may be implemented in other system architectures. While the spline technique is being described for creating shapes for use on an electronic video game, many more applications may be used including generation of two dimensional animations.

In FIG. 3, definitions for the splines are generated around a joint in a base position in block 302. Each one of the splines includes at least two points in two-dimensional space. The splines when combined form an object by indicating an outline of a shape in the base position.

In block 304, coordinate information is provided that indicates the position of the points on each spline corresponding to the outline of the shape at positions in the base position. In block 306, the coordinate information is generated by blending (a) relative positions of each of the splines with respect to positions of a first joint with (b) relative positions of each of the splines with respect to a second joint, when the shape is to be changed about a first joint and a second joint with respect to the base position. The blending can be determined by allocating a first predetermined amount to the position of spline with respect to the position of the first joint and allocating a second predetermined amount to the position of spline with respect to the position of the second joint using the spline curve formula.

In block 308, a new position of the spline is generated in response to the coordinate information indicative of the position of the points on the spline corresponding to the shape at the new position. The spline is generated using the coordinate information by changing 2-dimensional coordinate, angle and distance information related to the points with respect to one or both joints.

In block 310, the splines are corrected if necessary and rendered at the new position to form the outline of the shape of the object at the new position. The process then repeats in block 306 where new coordinate information is generated for use in rendering a new position of the spline around the joint.

Figure 4A:
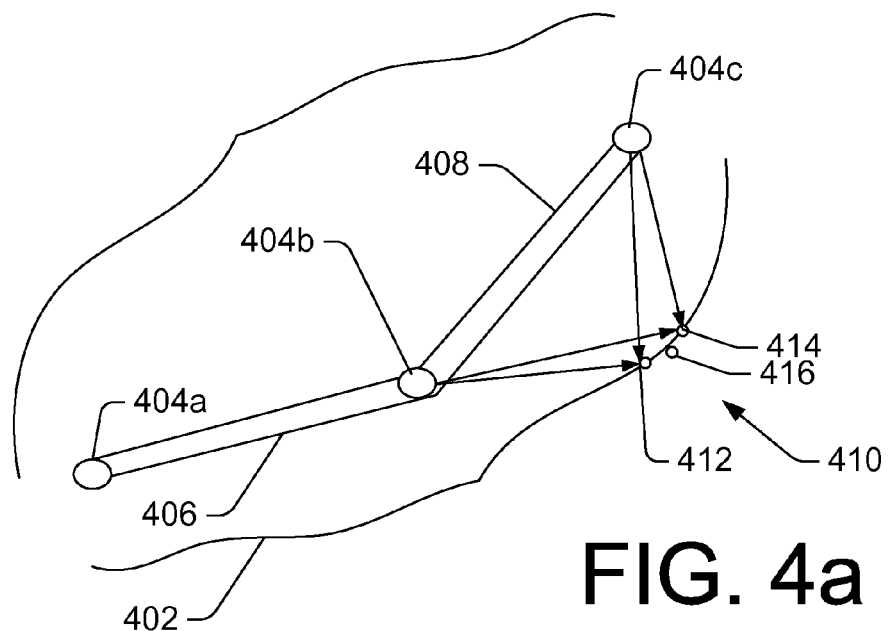
FIG. 4*a*-4*b* illustrates a process of generating new shapes upon the movement of joints.
Figure 4B:
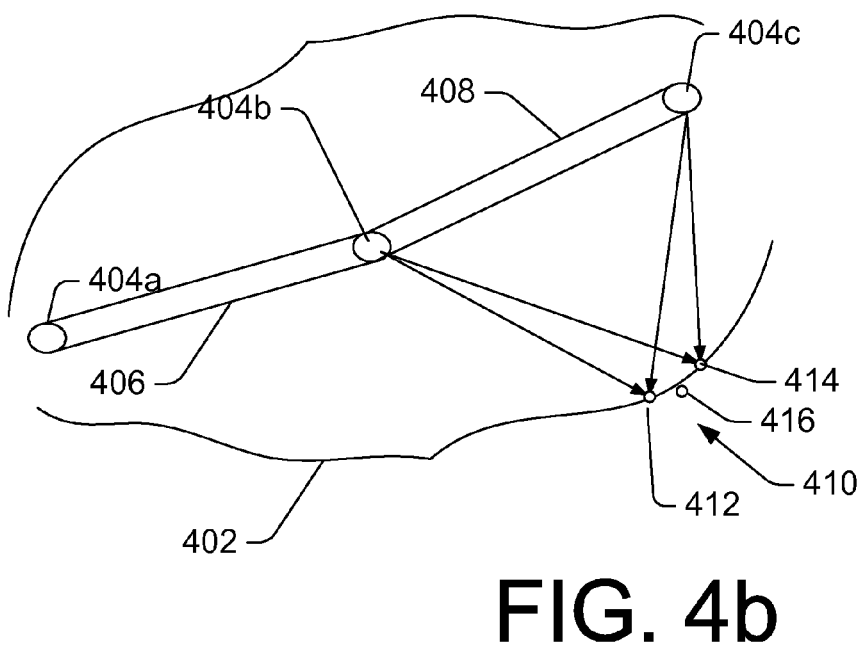

Details of the rendering of the process is described in FIGS. 4a and 4b. FIG. 4a shows a shape 402 containing joints 404a, 404b and 404c. Joints 404a is connected to segment 404b with segment or bone 406, and joints 404b is connected to segment 404c with bone 408.

Spline 410 contains points 412 and 414 that form a line segment on shape 402. The curvature and points of spline 410 are defined mathematically by point 416 (P3.x, P3.y), and points 412 (P2.x, P2.y), and 414 (P1.x, P1.y) using a spline curve formula for influencing points included in a 2-dimensional quadratic spline involving the points P1, P2, and P3. The formula for the points (x, y) on the spline, such as spline 410, may be expressed as two independent functions of t, where t is evaluated between 0 and 1:

$$x=t^2*(P3.x-2*P2.x+P1.x)+2t*(P2.x-P1.x)+P1.x$$

$$y=t^2*(P3.y-2*P2.y+P1.y)+2t*(P2.y-P1.y)+P1.y$$

In other words, in order to plot a curve of a spline, these two functions are calculated for many values of t between 0 and 1, which supplies a series of x and y coordinates. These coordinates will follow the curve of the spline (e.g. spline 410).

Points 412 and 414 of spline 410 also include point 416. Information defining spline 410 is stored in memory as coordinates relative to joints 404b and 404c. A weighting function is allocated to points 412 and 414 for spline 410 with respect to joint 404a. Another weighting function is allocated to points 412 and 414 with respect to joint 404b.

Shown in FIG. 4b is spline 410 with the orientation of joint 404c and bone 408 rotated approximately 15 degrees. When the joint 404c rotates, the position and orientation of spline 410 rotates proportionately. These coordinate changes would be stored in memory as information pertaining to spline 410. Further, as joint 404b rotates, the position of spline 410 also changes. In one implementation, a portion of the change in position and orientation of spline 410 is allocated to the changes of joint 404c, and a portion of the change in position and orientation of spline 410 is allocated to the changes of joint 404b. The resulting changes to points 412 and 414 (and 416) from the changes to joints 404b and 404c are blended together to set the final position (and coordinates) of points 412, 414 and 416. The spline 410 is redrawn with the final coordinates, resulting in a change in the position and orientation of shape 402.

Figure 5:
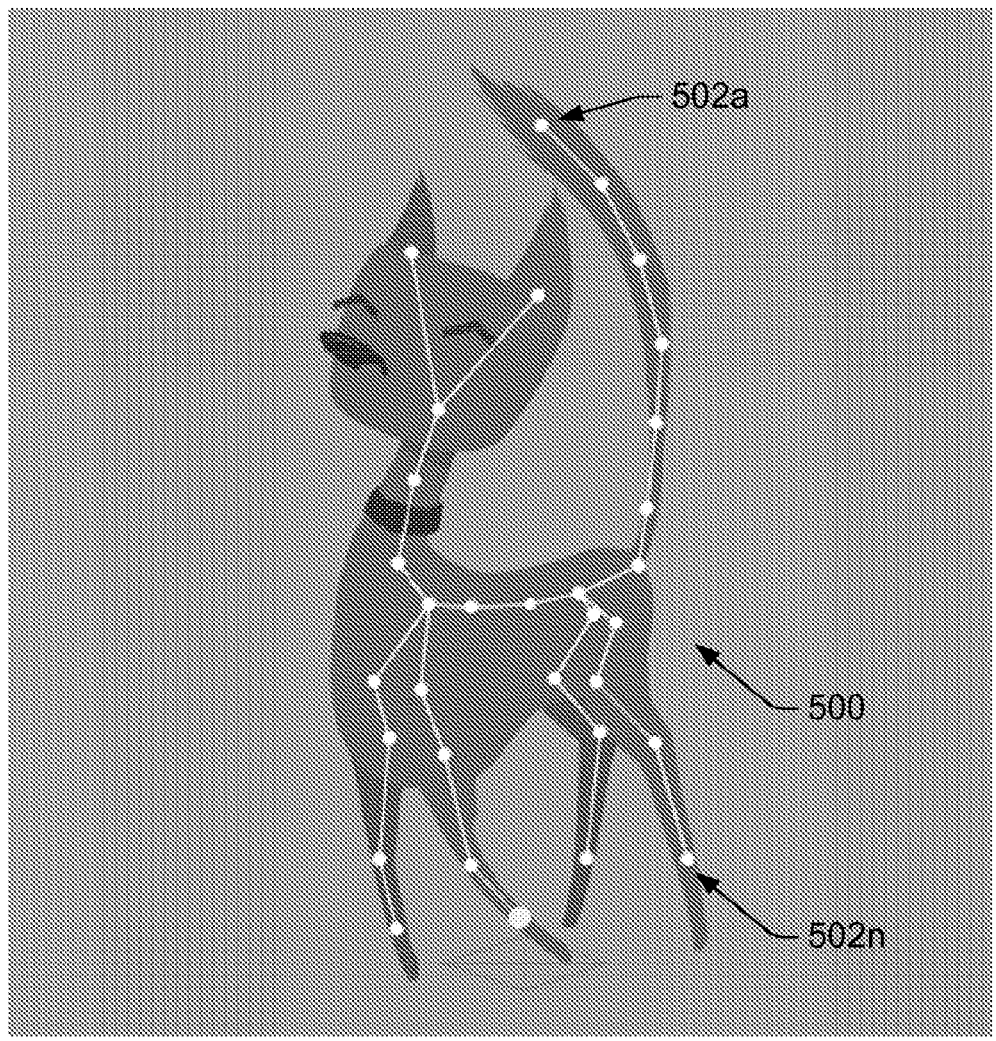
FIG. 5 illustrates an exemplary process of generating joints used for shape and spline generation.
Figure 6:
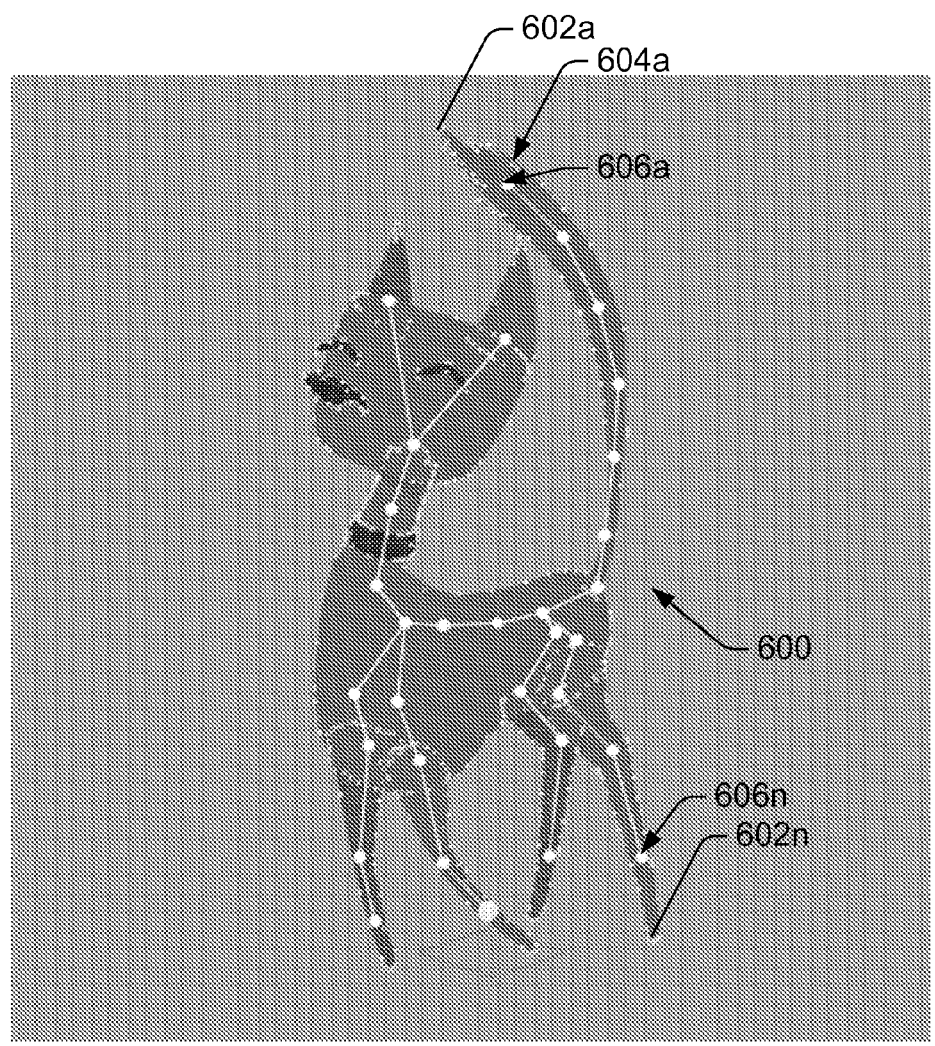
FIG. 6 illustrates an exemplary process of generating shapes and spline generation as a result from the joints generated in FIG. 5 using the process described in FIG. 3.

Show in FIG. 5 is an exemplary object 500 having many joints, including joints 502a-502n. A shape is formed around each of joints 502a-502n in the base position shown. Shown in FIG. 6 are points 602a-602n that are formed with respect to each of joints 606a-606n to compose a spline. Each of the splines created, such as spline 604a is associated with one or more joints, such as joint 606a. The splines are combined around shape of the object. As previously explained, once the splines are created, when the joint is moved, the splines associated with that joint are also move to change the position and orientation of the shape of the object.

CONCLUSION

In closing, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method for generating a computer graphic of a shape to be animated, the shape having at least one joint, wherein the shape changes about the joint, the method comprising:
   providing, by a computing device, a spline that includes at least two points, each point being defined in a two-dimensional space, the spline being indicative of an outline of the shape in a base position;
   providing, by the computing device, coordinate information corresponding to positions of the at least two points on the spline that indicate the outline of the shape at predefined positions when the shape is to be changed about the joint with respect to the base position;
   generating, by the computing device and based at least in part on the provided coordinate information, a new position of the spline to change the shape; and
   rendering, by the computing device, the spline at the new position to form the outline of the shape associated with the new position, each of the at least two points on the spline being defined in the two-dimensional space represented by (x,y), where:

$$x=t^2*(P3.x-2*P2.x+P1.x)+2t*(P2.x-P1.x)+P1.x$$

$$y=t^2*(P3.y-2*P2.y+P1.y)+2t*(P2.y-P1.y)+P1.y,$$

where t varies between 0 and 1, where (P2.x, P2.y) and (P1.x, P1.y) are points on the spline, and where (P3.x, P3.y) is a point that defines a curvature of the spline.

2. The method as recited in claim 1, further comprising:
   providing a second spline that includes at least two additional points being defined in the two-dimensional space, the second spline being indicative of a second shape in a second base position;
   providing additional coordinate information corresponding to a position of the at least two additional points on the second spline corresponding to the second shape at predefined positions that are interpolated based on positions of the first joint and a second joint when the second shape is to be changed about the second joint with respect to the second base position; and
   generating a new position of the second spline in response to the additional coordinate information that is indicative of the position of the at least two additional points on the second spline that corresponds to the second shape.

3. The method as recited in claim 1, wherein the shape further includes a second joint, and wherein the coordinate information is generated by blending positions of the first joint and the second joint when the shape has changed about the first joint and the second joint with respect to the base position.

4. The method as recited in claim 3, wherein the blending is determined by allocating a first predetermined amount to the position of the spline with respect to the position of the first joint and allocating a second predetermined amount to the position of the spline with respect to the position of the second joint.

5. The method as recited in claim 1, wherein the spline is defined by a two dimensional curve.

6. The method as recited in claim 5, wherein the spline includes a line connecting the at least two points and a third point, the third point controlling a curvature of the line as a function of a distance between the third point and a straight line connecting the at least two points.

7. The method as recited in claim 1, further comprising providing coordinate information by changing a two-dimensional coordinate, an angle, and distance information of the at least two points with respect to the joint.

8. The method as recited in claim 1 further comprising:
correcting the shape associated with the new position; and
rendering the shape associated with the new position.

9. A system for rendering a shape comprising:
a memory to store a spline that includes at least two points, each of the at least two points being defined in two-dimensional space, the spline being indicative of the shape in a base position, the memory to store coordinate information indicative of a position of the at least two points on the spline that corresponds to the shape at predefined positions when the shape has changed about a joint with respect to the base position; and
a processor communicatively coupled to the memory to:
generate a new position of the spline based at least in part on the coordinate information; and
render the shape associated with the new position to form an outline of the shape, each of the at least two points on the spline being defined in the two-dimensional space represented by (x,y), where:

$$x=t^2*(P3.x-2*P2.x+P1.x)+2t*(P2.x-P1.x)+P1.x$$

$$y=t^2*(P3.y-2*P2.y+P1.y)+2t*(P2.y-P1.y)+P1.y, \text{ and}$$

where t varies between 0 and 1, where (P2.x, P2.y) and (P1.x, P1.y) are points on the spline, and where (P3.x, P3.y) is a point that defines a curvature of the spline.

10. The system as recited in claim 9, wherein the memory stores a second spline comprising at least two additional points being defined in the two-dimensional space, the second spline being indicative of a second shape in a second base position, and wherein the memory stores additional coordinate information that indicates a position of the at least two additional points on the second spline that corresponds to the second shape at predefined positions that are blended based on positions of the joint and a second joint when the second shape has changed about the second joint with respect to the base position, and wherein the processor is operable to generate a new position of the second spline based at least in part on the additional coordinate information.

11. The system as recited in claim 9, wherein the shape further includes a second joint, and wherein the coordinate information includes a blending based on positions of the joint and the second joint when the shape has changed about the joint and the second joint with respect to the base position.

12. The system as recited in claim 11, wherein the processor is operable to determine the blending by allocating a first predetermined amount to a position of the spline with respect to the position of the joint and allocating a second predetermined amount to a position of the spline with respect to the position of the second joint.

13. The system as recited in claim 9, wherein the memory stores information related to the spline that includes information about a line connecting the at least two points and a third point that in combination with the at least two points defines a curvature of the line as a function of a distance between the third point and a straight line connecting the at least two points.

14. The system as recited in claim 9, wherein the processor is operable to provide the coordinate information by changing a two-dimensional coordinate, an angle, and distance information related to the at least two points with respect to the joint.

15. A non-transitory computer storage medium having computer readable instructions that, when executed by a processor, performs operations comprising:
providing a plurality of splines, each of the plurality of splines including at least two points, each of the at least two points being defined in two-dimensional space, the plurality of splines being indicative of an outline of a shape in a base position;
providing coordinate information that is indicative of a position of the at least two points on each of the plurality of splines, the position of the at least two points corresponding to the outline of the shape at positions in the base position, the coordinate information being generated by blending (a) relative positions of each of the plurality of splines with respect to positions of a first joint with (b) relative positions of each of the plurality of splines with respect to a second joint, when the shape is to be changed about the first joint and the second joint with respect to the base position;
generating a new position of the plurality of splines based at least in part on the coordinate information;
rendering the plurality of splines at the new position to form the outline of the shape associated with the new position, each of the at least two points on each of the plurality of splines being defined in the two-dimensional space represented by (x,y), where:

$$x=t^2*(P3.x-2*P2.x+P1.x)+2t*(P2.x-P1.x)+P1.x$$

$$y=t^2*(P3.y-2*P2.y+P1.y)+2t*(P2.y-P1.y)+P1.y, \text{ and}$$

where t varies between 0 and 1, where (P2.x, P2.y), (P1.x, P1.y) are points on at least one of the plurality of splines, and where (P3.x, P3.y) is a point that defines a curvature of at least one of the plurality of splines.

16. The non-transitory computer storage medium as recited in claim 15, wherein the blending is determined by allocating a first predetermined amount to the position of the plurality of splines with respect to the position of the first joint and allocating a second predetermined amount to the position of the plurality of splines with respect to the position of the second joint.

17. The non-transitory computer storage medium as recited in claim 15, wherein each of the plurality of splines include a line connecting the at least two points and a third point, the third point controlling a curvature of the line as a function of a distance between the third point and a straight line connecting the at least two points.

18. The non-transitory computer storage medium as recited in claim 15, wherein the operations further comprise providing coordinate information by changing a two-dimensional coordinate, an angle, and distance information of the at least two points with respect to the first joint or the second joint.

* * * * *